Dec. 20, 1949     H. T. LYTLE     2,491,673
SHOE FOR PIPE JOINTS
Filed Jan. 5, 1949     2 Sheets—Sheet 1
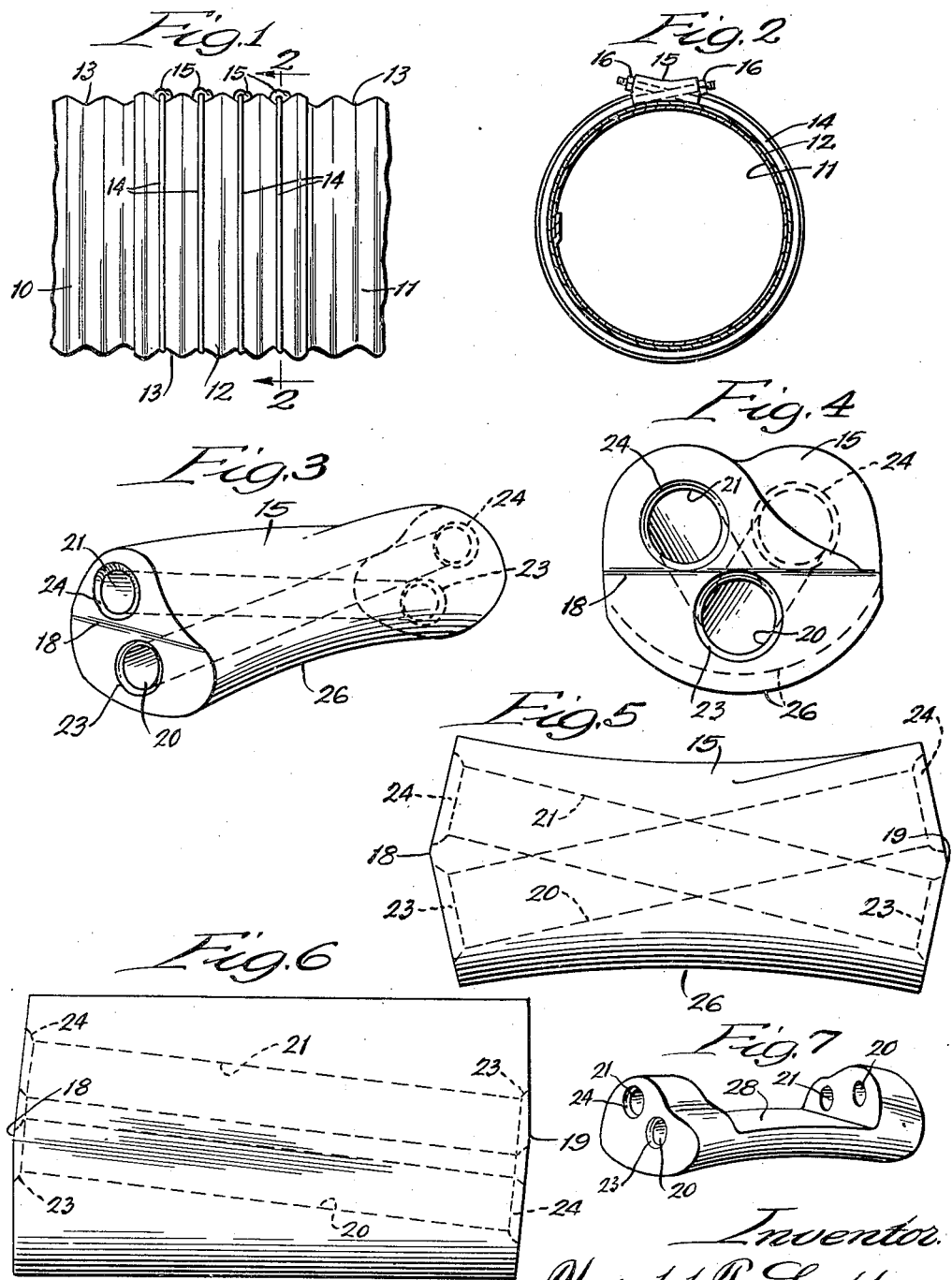
Inventor.
Harold T. Lytle,
By Dawson, Ooms, Booth and Spangenberg,
Attorneys.

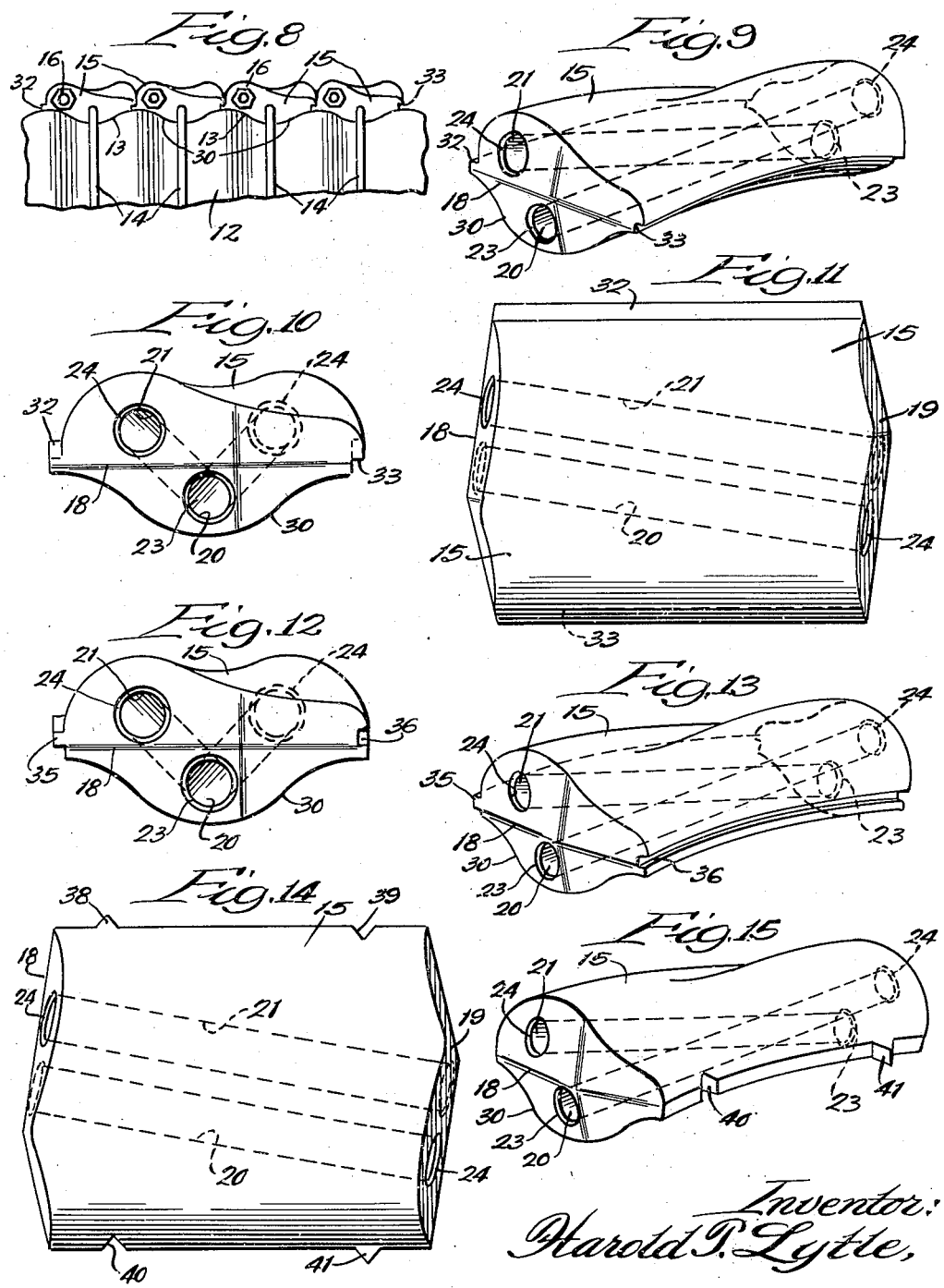

Patented Dec. 20, 1949

2,491,673

UNITED STATES PATENT OFFICE 2,491,673

SHOE FOR PIPE JOINTS

Harold T. Lytle, Lifkin, Tex., assignor to Texas Foundries, Inc., a corporation of Texas Application January 5, 1949, Serial No. 69,348

11 Claims. (Cl. 217—95)

This invention is directed to a shoe for securing the ends of a rod strap utilized for binding corrugated pipe joints.

In joining corrugated pipes it is usual to bring the corrugated pipes into substantial abutting relation and then cover the joint with a corrugated sleeve. Rod straps are then applied to the corrugated sleeve for clamping the same firmly to the pipe ends, especially where water tightness is desired.

The principal object of this invention is to provide an improved shoe for securing the ends of such rod straps wherein the ends of the rod straps may be readily received therein, wherein the rod straps may be readily tightened therein, wherein the shoe conforms substantially to the corrugations and circumferential contour of the corrugated pipes and sleeve to provide maximum bearing surface, and wherein shoes and rod straps may be applied to adjacent corrugations of the corrugated pipes and sleeve.

In carrying out this object of the invention the shoe preferably includes an elongated block having a pair of straight elongated passages therein, the first passage extending from a first end face of the block at a point on the vertical center and below the horizontal center to a second end face of the block at a point at one side of the vertical center and above the horizontal center for receiving one end of the rod strap, and the second passage extending from the second end face of the block at a point on the vertical center and below the horizontal center to the first end face of the block at a point on the opposite side of the vertical center and above the horizontal center for receiving the other end of the rod strap. Since the rod strap enters the shoe on the vertical center and below the horizontal center the rod strap and shoe are maintained in the center of the valley of the pipe corrugation. Since the ends of the rod strap extend from the shoe above the horizontal center and on opposite sides of the vertical center thereof, they do not interfere with each other and provide for ready manipulation of nuts applied thereto for tightening the rod strap.

Preferably, the end faces of the shoe above the horizontal center thereof are normal to the longitudinal passages opening therein to provide bearing surfaces for the tightening nuts carried by the ends of the rod strap. If the nuts utilized for tightening the rod strap have convex surfaces, the end surfaces of the shoe may be provided with cupped bearing surfaces for receiving the convex surfaces of the nuts. The ends of the longitudinal passages below the center of the block may be chamfered to facilitate the insertion of the ends of the rod therein.

The bottom surface of the block is preferably convex in transverse cross section to fit the valley of the pipe corrugation and is preferably concave in longitudinal cross section to conform substantially to the circumferential contour of the pipe joint. In this way the shoe has a large and effective bearing surface with the corrugated pipe joint to provide wide distribution of pressure resulting from tightening the rod strap. The shoe is preferably narrower than a complete pipe corrugation so that shoes may be placed side by side in adjacent corrugations. The shoes may be provided along their sides with interlocking devices for associating the shoes in adjacent pipe corrugations. The shoes are preferably cast from shock resisting malleable iron to permit forcible adjustment by a sledge hammer and provide sufficient strength with minimum size and weight.

Other objects and advantages of this invention will become apparent to those skilled in the art upon reference to the accompanying specification, claims and drawing in which:

Figure 1 is a side elevational view of a corrugated pipe joint with the shoe of this invention applied thereto;

Figure 2 is a vertical sectional view through the pipe joint taken substantially along the line 2—2 of Figure 1;

Figure 3 is a perspective view of the shoe.

Figure 4 is an end elevational view of the shoe taken from the left of Figure 3;

Figure 5 is a side elevational view of the shoe;

Figure 6 is a top plan view of the shoe; and

Figure 7 is a perspective view of another form of the shoe.

Figure 8 is a view similar to Fig. 1, but showing the application of another form of the shoe of this invention to a corrugated pipe joint;

Figure 9 is a perspective view of the shoe illustrated in Fig. 8;

Figure 10 is an end elevational view of the shoe illustrated in Fig. 9;

Figure 11 is a top plan view of the shoe illustrated in Figs. 9 and 10;

Figures 12 and 13 are end and perspective views respectively of another form of shoe;

Figures 14 and 15 are top plan and perspective views respectively of still another form of shoe.

Referring first to Figures 1 and 2, two corrugated pipes to be joined together are illustrated at 10 and 11. The pipes are brought into substantial abutting relationship and the adjacent ends of the pipe are covered with a corrugated sleeve 12. The corrugations of the pipes and sleeves are shown at 13. The sleeve 12 is clamped to the ends of the corrugated pipes 10 and 11 by rod straps 14 lying in the valleys of the corrugations. The ends of the rod straps 14 extend through passages in the shoe 15 of this invention. Nuts 16 secured to the ends of the rod straps engage the shoe 15 and operate to draw the rod straps 14 snugly about the pipe joint to clamp the sleeve 12 to the ends of the pipes 10 and 11.

The shoe 15 of this invention is illustrated in more detail in Figures 3 to 6. It includes an elongated block preferably cast from shock resisting malleable iron and is provided with a pair of end faces 18 and 19. A first straight longitudinal passage 20 extends from the end face 18 to the end face 19. It opens into the end face 18 on the vertical center of the block and below the horizontal center thereof and it opens into the other end face 19 above the horizontal center of the block and at one side of the vertical center. The block is also provided with a second straight longitudinal passage 21 which extends from the face 19 at a point on the vertical center and below the horizontal center to the end face 18 at a point above the horizontal center and on the opposite side of the vertical center. Thus, the lower ends of each longitudinal passage are located on the vertical center of the block below the horizontal center thereof and extend upwardly and outwardly to a point above the horizontal center of the block on opposite sides of the vertical center. Thus, the passages do not intersect, but still have their lower ends opening on the vertical center.

The lower ends of the passages 20 and 21 are chamfered as at 23 for readily guiding the ends of the rod straps into the passages. The end surfaces 18 and 19 of the block adjacent the passages 21 and 20 respectively above the horizontal center of the block are normal to the passages so as to provide surfaces which are square with the center lines of the passages. In this way the nuts 16 may accurately seat upon these surfaces. If the nuts 16 are of the type having a convex surface then the upper ends of the passages 21 and 20 may be cupped as at 24 to provide seats for the convex faces of the nuts.

The lower surface 26 of the block is made convex in transverse cross section as illustrated in Figure 4 so that it would fit the corrugation of the pipe joint. Likewise the lower surface 26 of the block is made concave in longitudinal cross section as illustrated in Figure 5 so that the block will substantially fit the circumferential contour of the joint.

In use the ends of the rod straps 14 are inserted through the longitudinal passages 21 and 20 and then the nuts 16 are applied to the rod strap. The nuts 16 are drawn tight against the end faces of the shoe thus clamping the sleeve 12 to the ends of the pipe sections 10 and 11. Due to the contour of the bottom surface of the shoe it will fit firmly in the corrugation of the pipe joint and in this respect operates to self-align itself during the tightening operation. If, however, it does not operate to self-align, it may be readily aligned by a sledge hammer, this being permitted by the rugged character of the shoe. Since the shoe substantially fits the corrugation of the pipe joint, it presents a large bearing surface to the corrugated pipe joint for the purpose of providing wide distribution of pressure resulting from te tightening of the rod strap. This effectively minimizes the danger of indenting the pipe joint.

In the form of the invention illustrated in Figure 7 the upper central surface of the block 15 is eliminated or depressed as shown at 28. This operates to reduce the weight and hence the cost of the shoe without appreciably decreasing the strength thereof. The passages 20 and 21 extend through the depression 28.

Figure 8 illustrates another form of the shoe of this invention as applied to a corrugated pipe joint and the details of construction of the shoe are illustrated in Figs. 9, 10 and 11. The shoe 15 of Figs. 8 to 11 is substantially the same as that of Figs. 1 to 7, and like reference characters are utilized for like parts. The shoe of Figs. 8 to 11 differs from the other form of shoe in the width of shoe, the contour of the bottom surface of the shoe and the provision of interlocking devices along the sides of the shoe.

The shoe of Figs. 8 to 11 is somewhat wider than the shoe of Figs. 1 to 7 and in order that the shoe may accurately fit within the pipe corrugations it has the bottom surface 30 thereof formed sinusoidally convex in transverse cross section. The shoe, therefore, presents a large bearing surface to the corrugated pipe joint for the purpose of providing even distribution of pressure resulting from the tightening of the rod straps. The sides of the shoe 15 are provided with interlocking devices in the form of a projection 32 and a recess 33. When the shoes 15 are placed in adjacent valleys of the corrugated pipe joint the projections 32 and recesses 33 overlay as illustrated in Fig. 8 for the purpose of interlocking the adjacent shoes.

In the form of the shoe illustrated in Figs. 12 and 13 a different form of interlocking device is utilized. Here one side of the shoe is provided with a tongue 35 and the other side with a groove 36. When the shoes are placed in adjacent corrugations of the pipe joint the tongues 35 thereof enter the grooves 36 to interlock the adjacent shoes.

In the form of the invention illustrated in Figs. 14 and 15 one of the sides of the shoe is provided with a key 38 and a notch 39 while the other side is provided with a notch 40 and a key 41. The keys and notches form interlocking devices for interlocking adjacent shoes and in this respect the keys 38 and 41 enter the notches 40 and 39. By reason of the key and notch arrangement as illustrated in Figs. 14 and 15 it makes no difference whether the shoes are reversed end to end for the keys will always fit the notches regardless of end for end position of the shoes.

While for purposes of illustration, several forms of this invention have been disclosed, other forms thereof may become apparent to those skilled in the art upon reference to this disclosure, and therefore, this invention is to be limited only by the scope of the appended claims.

I claim as my invention:

1. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap.

2. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the end faces of the block above the horizontal center of the block being normal to the longitudinal passages opening therein to provide bearing surfaces for nuts carried by the ends of the rod strap.

3. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the ends of the longitudinal passages terminating above the horizontal center of the block being provided with cupped bearing surfaces for receiving the convex surfaces of nuts carried by the ends of the rod strap.

4. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the ends of the longitudinal passages terminating below the horizontal center of the block being chamfered to provide ready insertion of the ends of the rod strap therein.

5. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the bottom surface of the block being convex in transverse cross section to fit the valley of the pipe corrugation.

6. A shoe for securing the ends of a rod strap for binding corrugated pipe joints comprising an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the bottom surface of the block being concave in longitudinal cross section to conform substantially to the circumference of the corrugated pipe joint.

7. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the bottom surface of the block being convex in transverse cross section to fit the valley of the pipe corrugation, the bottom surface of the block being concave in longitudinal cross section to conform substantially to the circumference of the corrugated pipe joint.

8. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the sides of the block being provided with interlocking devices for interlocking shoes located in adjacent pipe corrugations.

9. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the width of the block being substantially as wide as the pipe corrugation and the bottom surface of the block being sinusoidally convex in transverse cross section to fit the valley of the pipe corrugation.

10. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap and a second straight longitudinal passage extending from the second end face of the block at a point on the vertical center and below the horizontal center of the block to the first end face of the block at a point at the opposite side of the vertical center and above the horizontal center of the block for receiving the other end of the rod strap, the width of the block being substantially as wide as the pipe corrugation and the bottom surface of the block being sinusoidally convex in transverse cross section to fit the valley of the pipe corrugation, the sides of the blocks being provided with interlocking devices for interlocking shoes in adjacent pipe corrugations.

11. A shoe for securing the ends of a rod strap for binding corrugated pipe joints comprising, an elongated block having a first straight longitudinal passage extending from a first end face of the block at a point on the vertical center and below the horizontal center of the block to a second end face of the block at a point at one side of the vertical center and above the horizontal center of the block for receiving one end of the rod strap, a second straight longitudinal passage extending from the second end face of the block at a point on the vertical center and below the horizontal center of the block to the first end face of the block at a point at the opposite side of the vertical center and above the horizontal center of the block for receiving the other end of the rod strap, and the upper central portion of the block being depressed with the passages extending through the depression.

HAROLD T. LYTLE.

No references cited.